US012398798B2

United States Patent
Naitou et al.

(10) Patent No.: US 12,398,798 B2
(45) Date of Patent: Aug. 26, 2025

(54) LUBRICATION SYSTEM AND PLANETARY GEAR MECHANISM

(71) Applicant: KOMATSU LTD., Tokyo (JP)

(72) Inventors: Keita Naitou, Tokyo (JP); Tetsuya Yamauchi, Tokyo (JP); Yuta Yamauchi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 18/726,232

(22) PCT Filed: Feb. 1, 2023

(86) PCT No.: PCT/JP2023/003267
§ 371 (c)(1),
(2) Date: Jul. 2, 2024

(87) PCT Pub. No.: WO2023/176179
PCT Pub. Date: Sep. 21, 2023

(65) Prior Publication Data
US 2025/0067334 A1    Feb. 27, 2025

(30) Foreign Application Priority Data
Mar. 14, 2022  (JP) ................................. 2022-039345

(51) Int. Cl.
*F16H 57/04*    (2010.01)
*F16H 1/28*    (2006.01)

(52) U.S. Cl.
CPC ........... *F16H 57/0431* (2013.01); *F16H 1/28* (2013.01); *F16H 57/0435* (2013.01); *F16H 57/0486* (2013.01)

(58) Field of Classification Search
CPC .... F16H 57/0431; F16H 1/28; F16H 57/0435; F16H 57/0424; F16H 57/042; F16H 57/0486
See application file for complete search history.

(56) References Cited

U.S. PATENT DOCUMENTS

| | | | |
|---|---|---|---|
| 8,894,542 B2 * | 11/2014 | Aoki | B60W 20/14 475/8 |
| 8,905,885 B2 * | 12/2014 | Yamamoto | B60K 6/26 184/6.12 |
| 2011/0124461 A1 | 5/2011 | Torii et al. | |

FOREIGN PATENT DOCUMENTS

| | | |
|---|---|---|
| JP | 2011-112127 A | 6/2011 |
| KR | 10-2007-0039815 A | 4/2007 |

OTHER PUBLICATIONS

The International Search Report for the corresponding international application No. PCT/JP2023/003267, issued on Apr. 25, 2023.

* cited by examiner

*Primary Examiner* — Derek D Knight
(74) *Attorney, Agent, or Firm* — GLOBAL IP COUNSELORS, LLP

(57) ABSTRACT

A planetary gear mechanism has a helical gear. A lubrication system for the planetary gear mechanism includes a first lubricating oil supply path, a second lubricating oil supply path, and a controller. The first lubricating oil supply path is disposed on one side of the helical gear in a direction along a rotation axis of the helical gear. The first lubricating oil supply path is formed toward a tooth surface of the helical gear. The second lubricating oil supply path is disposed on an other side of the helical gear. The second lubricating oil supply path is formed toward the tooth surface of the helical gear. The controller switches discharge of lubricating oil to the tooth surface of the helical gear between the first lubricating oil supply path and the second lubricating oil supply path based on a rotation direction of the helical gear.

8 Claims, 7 Drawing Sheets

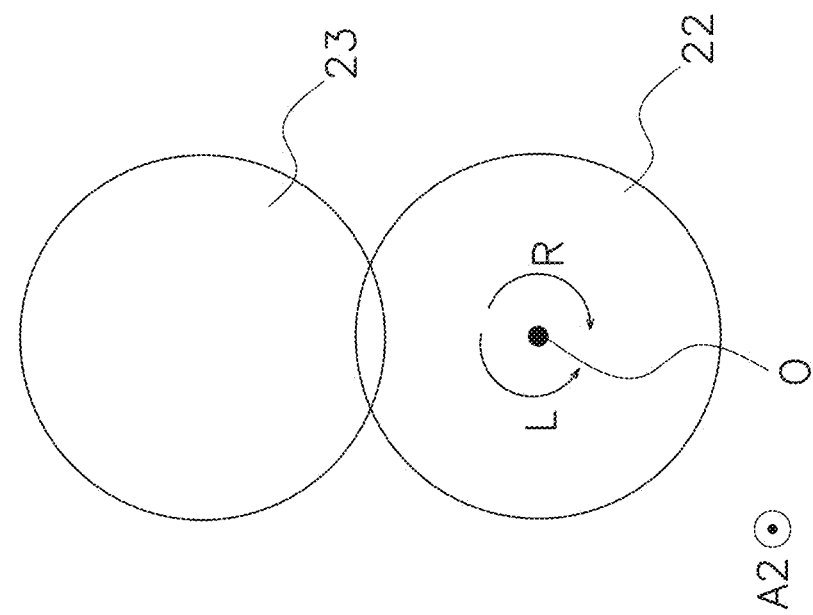
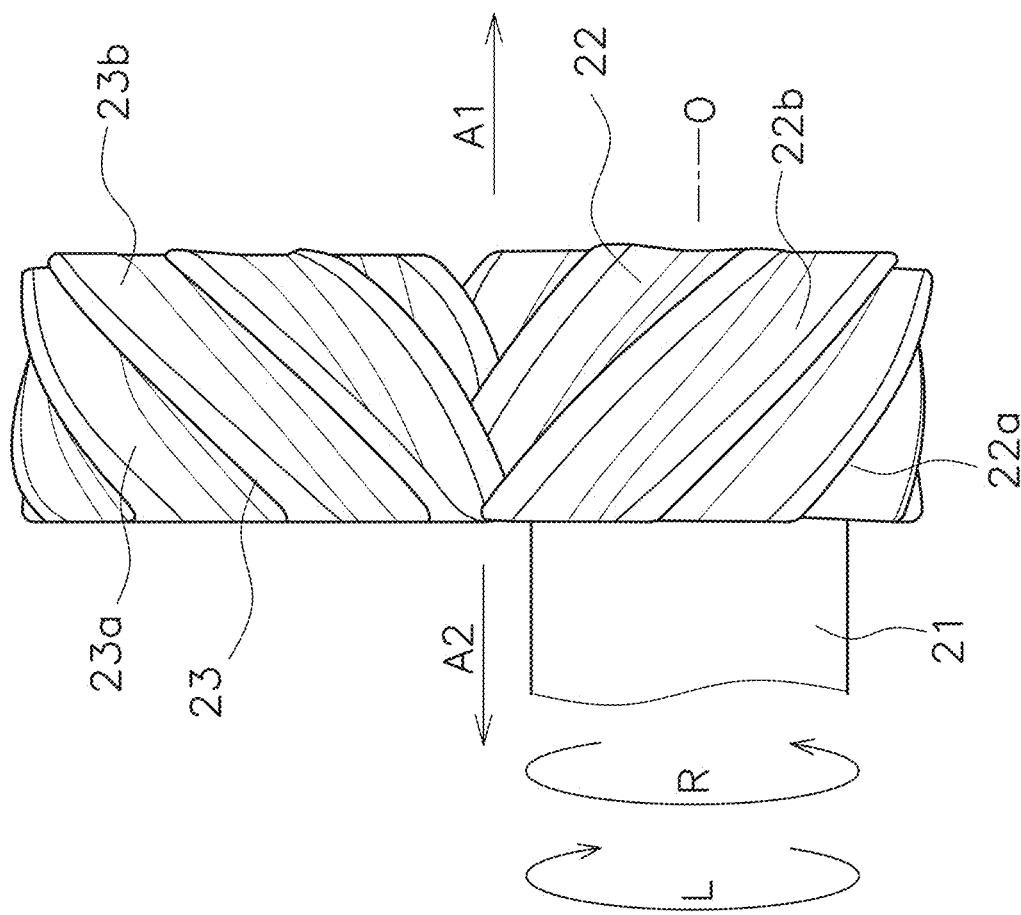

LUBRICATION SYSTEM AND PLANETARY GEAR MECHANISM

CROSS-REFERENCE TO RELATED APPLICATIONS

This application is a U.S. National stage application of International Application No. PCT/JP2023/003267, filed on Feb. 1, 2023. This U.S. National stage application claims priority under 35 U.S.C. § 119 (a) to Japanese Patent Application No. 2022-039345, filed in Japan on Mar. 14, 2022, the entire contents of which are hereby incorporated herein by reference.

BACKGROUND

Technical Field

The present invention relates to a lubrication system and a planetary gear mechanism.

Background Information

In recent years, high-speed rotation has been required for planetary gear mechanisms used in transmissions and the like, as the needs for electrification increase. From the perspective of reducing the noise caused by high-speed rotation and enhancing the transmission torque, helical-teeth gears are used in such a planetary gear mechanism.

In the planetary gear mechanism using helical gears as shown in Japanese Patent Application Publication No. 2011-112127, the lubricating oil for lubricating the tooth surfaces flows along the rotation axis, so the lubricating oil is supplied from the upstream side in the flow direction.

SUMMARY

However, in high-speed rotations, where both forward and reverse rotations are frequently used, such as in construction machinery, if lubricating oil is supplied in response to the rotation of the helical gear in one direction, there is a risk that the tooth surface is not be sufficiently lubricated when the helical gear is rotated in the opposite direction. Conversely, if lubricating oil is supplied so as to provide sufficient lubrication regardless of whether the rotor is rotated in the forward or reverse direction, the amount of lubricating oil is excessive, resulting in large agitation losses.

An object of the present disclosure is to provide a lubrication system and a planetary gear mechanism that are capable of sufficiently lubricating a tooth surface and reducing agitation loss in a planetary gear mechanism using helical gears in which both forward and reverse rotations are frequently used.

A lubrication system of the first aspect according to the present disclosure is a lubrication system for a planetary gear mechanism having a helical gear, and includes a first lubricating oil supply path, a second lubricating oil supply path, and a controller. The first lubricating oil supply path is disposed on one side of both sides of the helical gear in a direction along a rotation axis of the helical gear, and is formed toward the tooth surface of the helical gear. The second lubricating oil supply path is disposed on the other side of both sides of the helical gear and is formed toward the tooth surface of the helical gear. The controller switches discharge of lubricating oil to the tooth surface of the helical gear between the first lubricating oil supply path and the second lubricating oil supply path based on a rotation direction of the helical gear.

A planetary gear mechanism of the second aspect according to the present disclosure includes a first lubricating oil supply path and a second lubricating oil supply path. The first lubricating oil supply path is disposed on one side of both sides of a helical gear in a direction along a rotation axis of the helical gear, and is formed toward a tooth surface of the helical gear. The second lubricating oil supply path is disposed on the other side of both sides of the helical gear and is formed toward the tooth surface of the helical gear.

According to the present disclosure, it is possible to provide a lubrication system and a planetary gear mechanism that are capable of sufficiently lubricating a tooth surface and reducing agitation loss in a planetary gear mechanism using helical gears in which both forward and reverse rotations are frequently used.

BRIEF DESCRIPTION OF THE DRAWINGS

FIG. 6A is a diagram provided as a side schematic view showing a state in which the sun gear and a planetary gear are in mesh.

FIG. 6B is a diagram provided as a schematic view of the sun gear and the planetary gear viewed along the first direction.

DETAILED DESCRIPTION OF EMBODIMENTS

A planetary gear mechanism and a lubrication system having a planetary gear mechanism according to an embodiment of the present disclosure will be described with reference to the drawings. The planetary gear mechanism of this embodiment is used, for example, in the drive system of a work machine.

(Structure)
(Outline of Driving System 2 of Work Machine 1)

Figure 1:
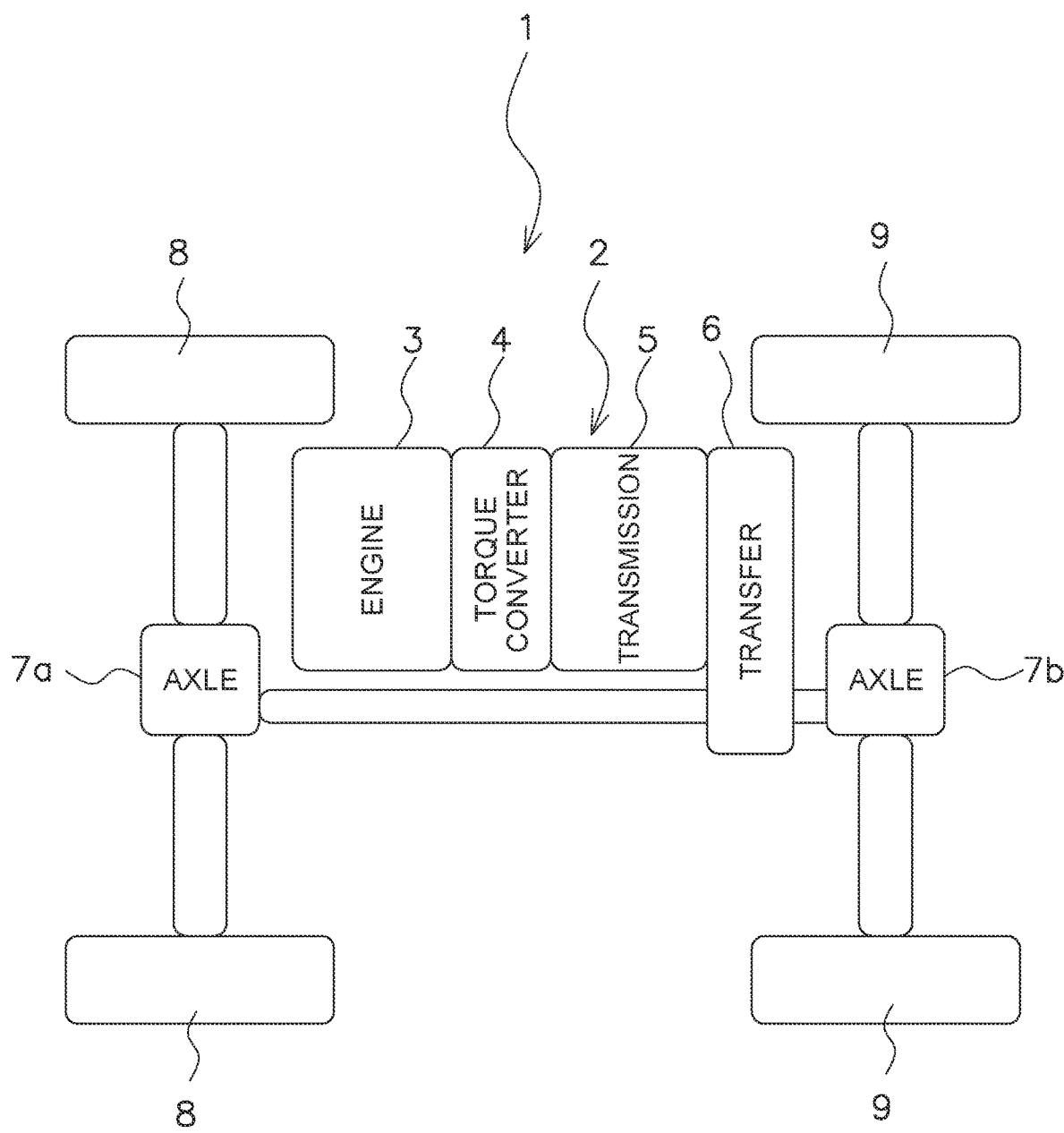
FIG. 1 is a schematic diagram showing a drive system of a work machine according to an embodiment of the present disclosure.

FIG. 1 is a schematic diagram showing a drive system 2 of a work machine 1. The drive system 2 of the work machine 1 includes an engine 3, a torque converter 4, a transmission 5, a transfer 6, axles 7a, 7b, a pair of front tires 8, and a pair of rear tires 9. The engine 3 is, for example, a diesel engine. The driving force generated by the engine 3 is transmitted to the torque converter 4. The torque converter 4 transmits the driving force generated by engine 3 to the transmission 5.

The transmission 5 decelerates the driving force transmitted from the engine 3 via torque converter 4, and transmits it to the transfer 6. The planetary gear mechanism 11 of the present embodiment, which will be described later, is used as a reducer of the transmission 5, for example.

The transfer 6 distributes the driving force transmitted from the transmission 5 to the front and rear axles 7a and 7b. The pair of front tires 8 are connected to the front axle 7a. The pair of front tires 8 are rotated by the power from the engine 3 distributed to the front axle 7a. The pair of rear tires 9 are connected to the rear axle 7b. The pair of rear tires 9 are rotated by the power from the engine 3 distributed to the rear axle 7b.

Figure 2:
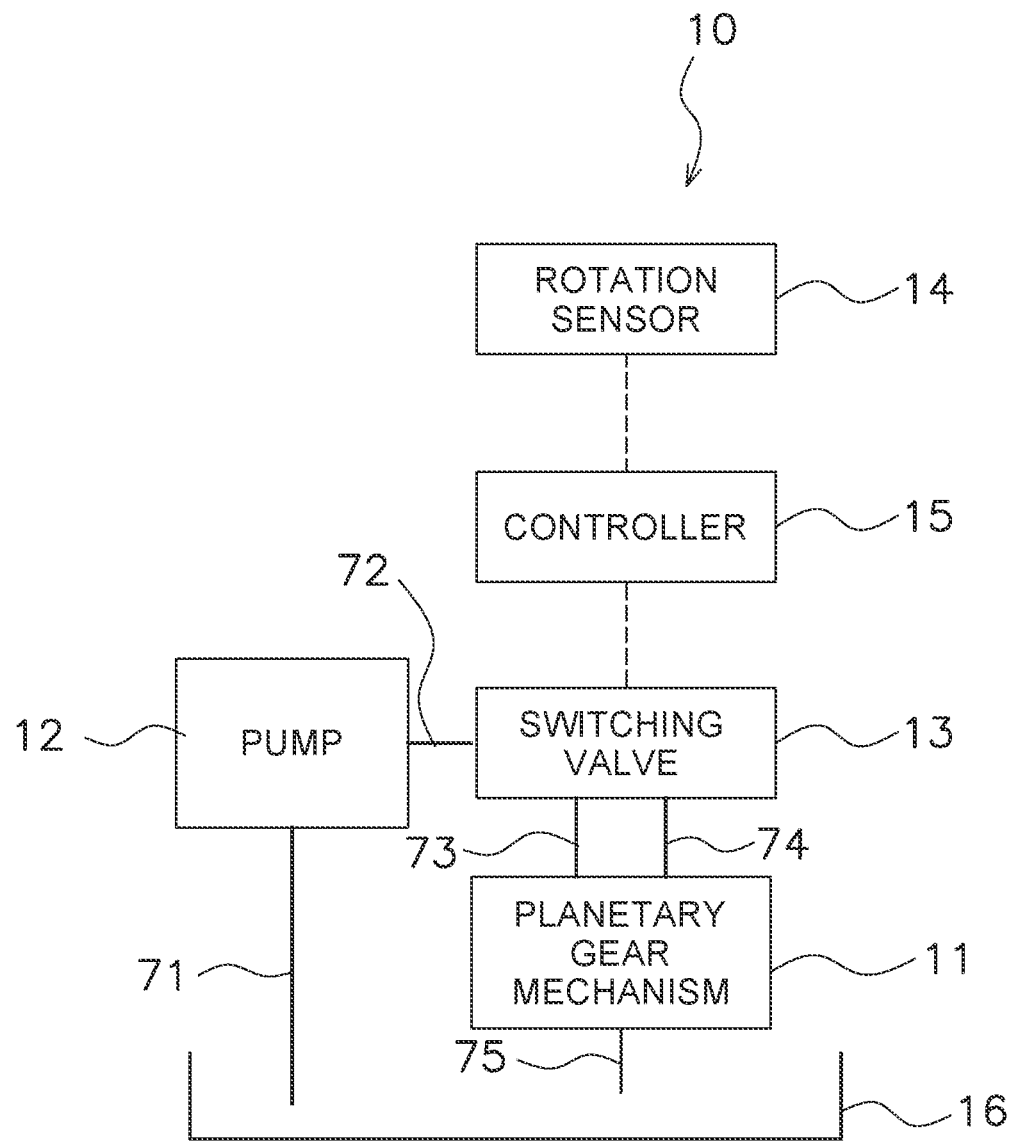
FIG. 2 is a block diagram showing a lubrication system according to the embodiment of the present disclosure.

The work machine 1 is equipped with a lubrication system 10 for lubricating the gears of a planetary gear mechanism 11. FIG. 2 is a block diagram showing a structure of the lubrication system 10. The lubrication system 10 includes a planetary gear mechanism 11, a pump 12, a switching valve 13, a rotation sensor 14, and a controller 15.

The pump 12 supplies lubricating oil to the planetary gear mechanism 11 from a tank 16 that stores lubricating oil. As will be described in detail later, the planetary gear mechanism 11 includes a plurality of supply paths for supplying lubricating oil to the gears. The switching valve 13 switches the supply of lubricating oil between the plurality of supply paths. The rotation sensor 14 detects information to determine the rotation directions of the gears. The controller 15 controls the pump 12 and the switching valve 13. The controller 15 controls the switching valve 13 based on the information detected by the rotation sensor 14.

(Planetary Gear Mechanism 11)

Figure 3:
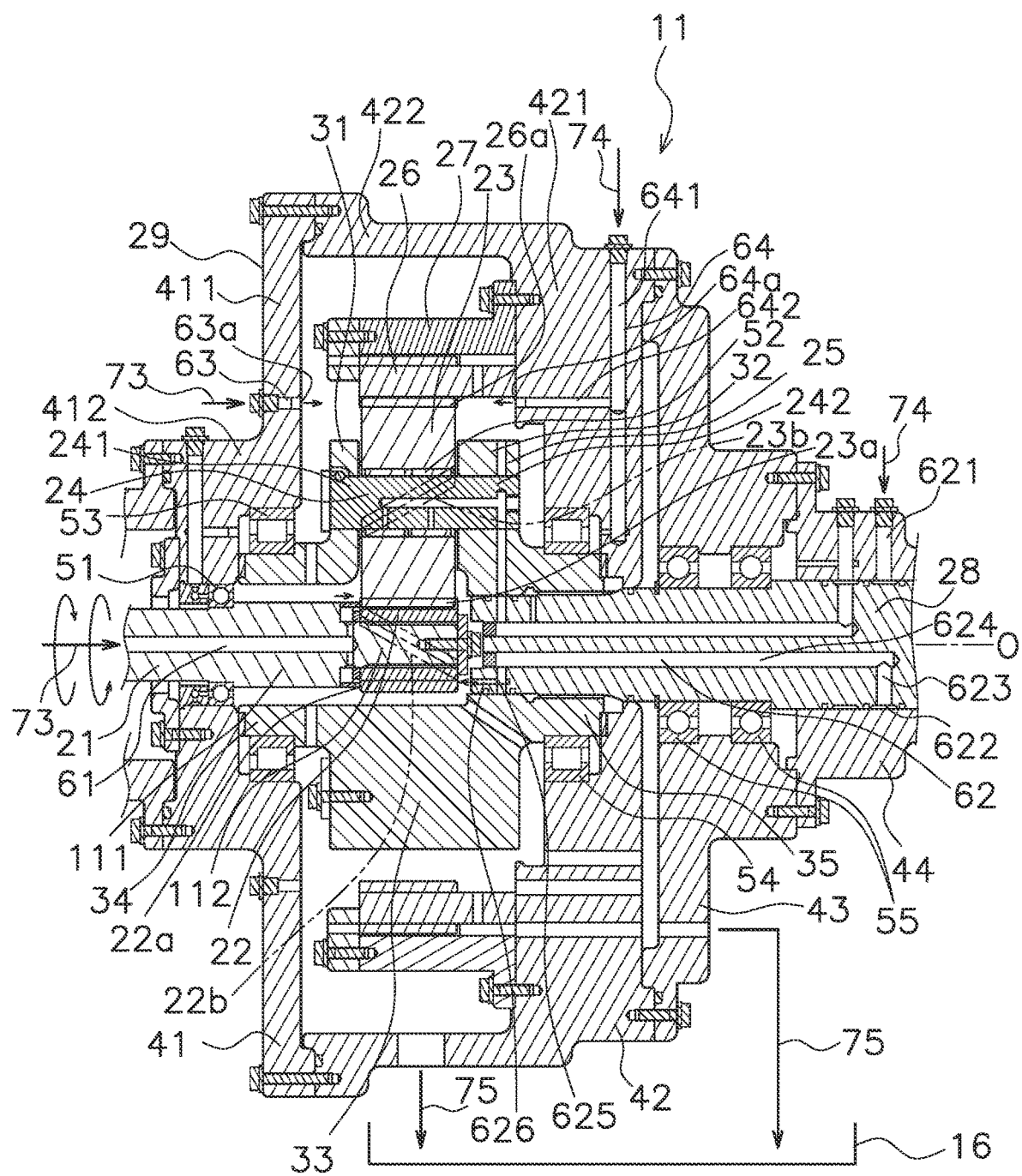
FIG. 3 is a cross-sectional view showing a planetary gear mechanism according to the embodiment of the present disclosure.

FIG. 3 is a cross-sectional diagram showing the planetary gear mechanism 11 of the present embodiment.

The planetary gear mechanism 11 comprises an input shaft 21 (an example of a first shaft), a sun gear 22 (an example of a helical gear), a plurality of planetary gears 23, a pinion shaft 24, a planetary carrier 25, a ring gear 26 (an example of a helical gear), a fixing member 27, an output shaft 28 (an example of a second shaft), and a housing 29.

Figure 4:
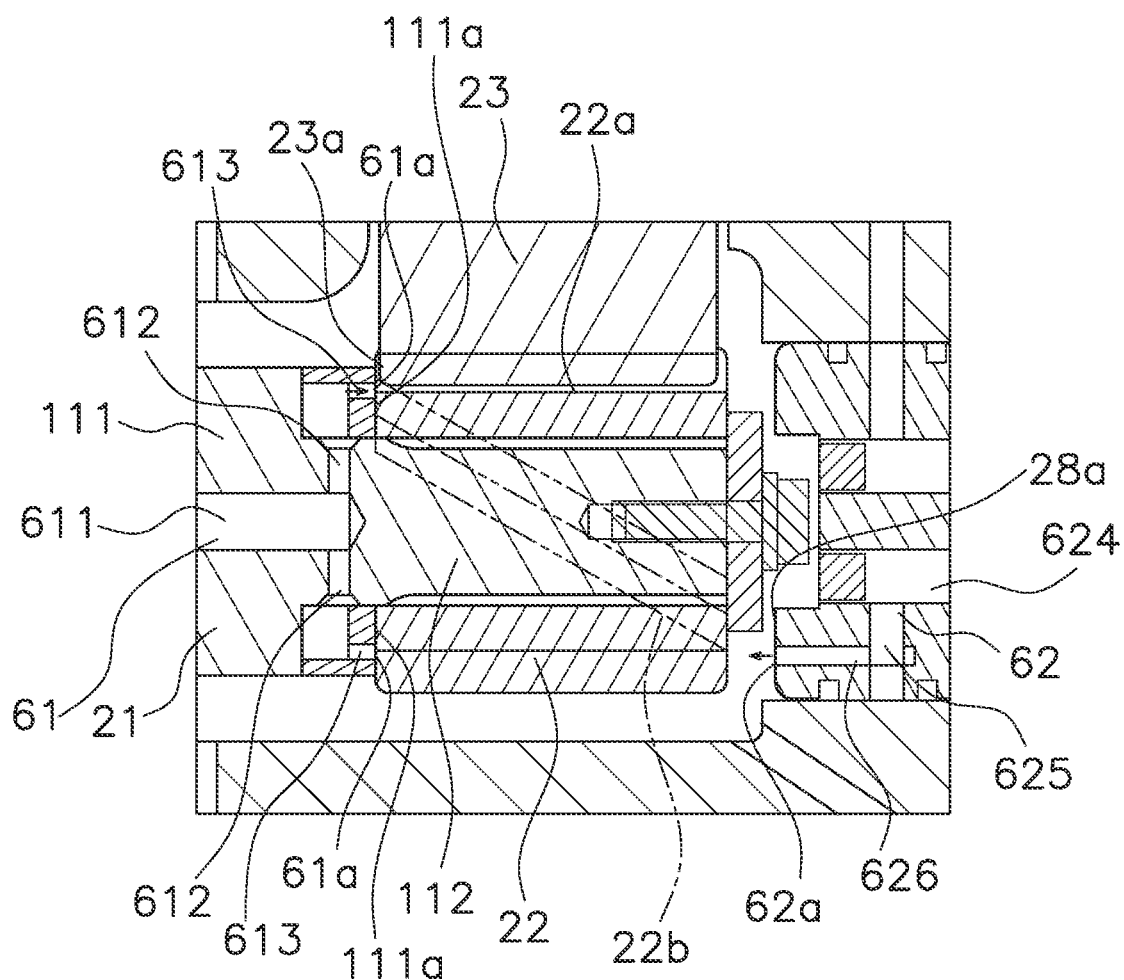
FIG. 4 is an enlarged diagram showing a sun gear and the vicinity thereof in FIG. 3.

Power is input to the input shaft 21. In FIG. 1, the power from the engine 3 is input via the torque converter 4. The input shaft 21 is a cylindrical member. The input shaft 21 is positioned in the housing 29. The input shaft 21 is rotatably supported with respect to the housing 29 by a bearing 51 that is arranged on the housing 29. In FIG. 3, the central axis of the input shaft 21 is shown as the line O. The input shaft 21 is arranged coaxially with the output shaft 28 which will be described later. Among the directions parallel to the central axis O, the direction extending from the input shaft 21 toward the output shaft 28 is defined as a first direction A1, and the direction extending from the output shaft 28 toward the input shaft 21 and opposite to the first direction A1 is defined as a second direction A2. The input shaft 21 includes a main body 111 and an end portion 112. The end portion 112 is located at the end of the main body 111 in the first direction A1. FIG. 4 is an enlarged view showing the sun gear 22 and the vicinity thereof. The end portion 112 is formed to be smaller than the outer diameter of the main body 111. The main body 111 and the end portion 112 form a step therebetween. At the step portion, the main body 111 has an end surface 111a that is perpendicular to the central axis O.

The sun gear 22 is fixed to the tip of the input shaft 21. The sun gear 22 is arranged coaxially with the input shaft 21. The sun gear 22 is disposed around the end portion 112, which is disposed within the housing 29, of the input shaft 21. The sun gear 22 rotates about the axis O together with the input shaft 21. The sun gear 22 is a helical gear. The sun gear 22 includes a tooth surface 22a that has helical teeth 22b. The helical teeth 22b of the sun gear 22 are indicated by two-dot chain lines in FIGS. 3 and 4. The helical teeth 22b are arranged at an angle to the axis O.

Figure 5A:
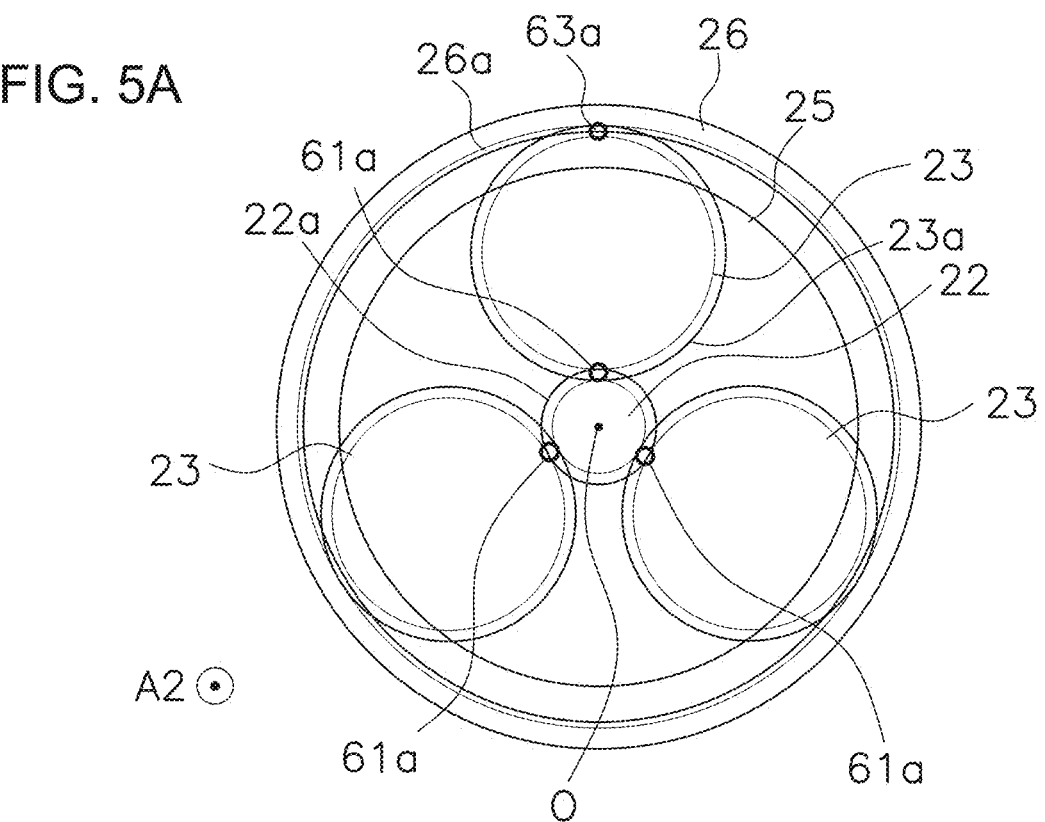
FIG. 5A is a diagram provided as a schematic view showing a positional relationship between an opening for discharging lubricating oil and gears when a planetary gear mechanism is viewed along a first direction.

As shown in FIG. 3, the plurality of planetary gears 23 is arranged around the sun gear 22. In the present embodiment, three planetary gears 23 are mounted, as shown in FIG. 5A, which will be described later. The planetary gears 23 are each a helical gear. As shown in FIG. 3, the planetary gears 23 each include a tooth surface 23a that has helical teeth 23b. The helical teeth 23b of the planetary gears 23 are indicated by two-dot chain lines in FIG. 3. The helical teeth 23b are arranged at an angle to the axis O. The planetary gears 23 are rotatably supported by the pinion shafts 24. The planetary gears 23 rotate around a direction parallel to the axis O.

The pinion shafts 24 are each set in the center of each planetary gear 23. A bearing 52 is arranged around each pinion shaft 24. The planetary gears 23 are arranged around the bearings 52. The bearings 52 allow the planetary gears 23 to rotate against the pinion shafts 24. The pinion shaft 24 is provided for each planetary gear 23. In the present embodiment, three pinion shafts 24 are provided to the three planetary gears 23, respectively.

The planetary carrier 25 supports the plurality of pinion shafts 24. The plurality of pinion shafts 24 are fixed to the planetary carrier 25. The planetary carrier 25 includes a first carrier disk 31, a second carrier disk 32, and plural carrier columns 33, a first carrier boss 34, and a second carrier boss 35.

The first carrier disk 31 has a disk shape. First ends 241 of the plurality of pinion shafts 24 (the ends in the second direction A2) are fixed to the first carrier disk 31. The first carrier disk 31 is disposed to the second-direction A2 side of the plurality of planetary gears 23. The first carrier disk 31 has a through-hole therethrough along the central axis O, and the input shaft 21 is positioned in the through-hole.

The second carrier disk 32 has a disk shape. Second ends 242 of the plurality of pinion shafts 24 (the ends in the first direction A1) are fixed to the second carrier disk 32. The second carrier disk 32 is arranged to the first-direction A1 side of the plurality of planetary gears 23. The second carrier disk 32 has a through-hole therethrough along the central axis O, and the output shaft 28 is positioned in the through-hole.

The plurality of the planetary gears 23 are disposed between the first carrier disk 31 and the second carrier disk 32. The plurality of carrier columns 33 connect between the first carrier disk 31 and the second carrier disk 32. The carrier columns 33 are arranged between the planetary gears 23 in a circumferential direction.

The first carrier boss 34 protrudes from the first carrier disk 31 in the second direction A2. The input shaft 21 is positioned in the first carrier boss 34.

The second carrier boss 35 protrudes from the second carrier disk 32 in the first direction A1. The output shaft 28 is positioned in the second carrier boss 35.

The first carrier boss 34 is rotatably supported by the housing 29 via a bearing 53. The second carrier boss 35 is rotatably supported by the housing 29 via a bearing 54.

The ring gear 26 is arranged around the plurality of planetary gears 23. The ring gear 26 has an annular shape. The ring gear 26 has an inner peripheral surface where the tooth surface 26a is formed, the tooth surface 26a having helical teeth that mesh with the helical teeth 23b of the planetary gears 23. The ring gear 26 is fixed to the housing 29 via the fixing member 27.

The fixing member 27 is annular. The fixing member 27 is disposed on the outer peripheral side of the ring gear 26. The fixing member 27 is fixed to the housing 29. The fixing member 27 is in mesh with the teeth arranged on the outer periphery of the ring gear 26.

The output shaft 28 is arranged coaxially with the input shaft 21 (on the central axis O). The output shaft 28 is in mesh with the planetary carrier 25 by spline teeth. The output shaft 28 is rotatably supported with respect to the housing 29 by a plurality of bearings 55 arranged on the housing 29. The planetary carrier 25 and the second carrier disk 32 each have a through-hole along the axis O. The output shaft 28 is positioned in these through-holes and fixed to the second carrier disk 32 and the second carrier boss 35.

The housing 29 accommodates the sun gear 22, the plurality of planetary gears 23, the pinion shafts 24, the planetary carrier 25, the ring gear 26, and the fixing member 27. The input shaft 21 and the output shaft 28 are positioned in the housing 29.

The housing 29 includes a first support portion 41, a second support portion 42, a third support portion 43, and a fourth support portion 44.

The first support portion 41 is arranged to the second-direction A2 side of the first carrier disk 31. The first support portion 41 has a wall portion 411 and a protruding portion 412. The wall portion 411 is arranged parallel to the first carrier disk 31. The wall portion 411 is arranged around the first carrier boss 34. The protruding portion 412 protrudes from the wall portion 411 in the second direction A2. The protruding portion 412 has a through-hole where the input shaft 21 is placed. The bearing 51 is arranged between the input shaft 21 and the inner wall of the through-hole of the protruding portion. With this configuration, the housing 29 rotatably supports the input shaft 21. The wall portion 411 has a through-hole along the axis O. The first carrier boss 34 is positioned in the through-hole. The bearing 53 is arranged between the first carrier boss 34 and the inner wall of the through-hole of the wall portion 411. With this configuration, the first support portion 41 rotatably supports the first carrier boss 34.

The second support portion 42 is arranged so as to cover the second carrier disk 32 on the first-direction A1 side and the ring gear 26 on the radially outer side. The second support portion 42 has a wall portion 421 and an outer edge portion 422. The wall portion 421 is arranged to the first-direction A1 side of the second carrier disk 32. The wall portion 421 has a through-hole along the axis O. The second carrier boss 35 is positioned in this through-hole. The second support portion 42 rotatably supports the second carrier boss 35. The bearing 54 is arranged between the second carrier boss 35 and the inner wall of the through-hole of the wall portion 421.

The outer edge portion 422 extends from the outer peripheral end of the wall portion 421 in the second direction A2. The end of the outer edge portion 422 in the second direction A2 is connected to the outer peripheral portion of the wall portion 411.

The first support portion 41 rotatably supports the first carrier boss 34, and the second support portion 42 rotatably supports the second carrier boss 35, and thereby the planetary carrier 25 is rotatably supported by the housing 29.

The third support portion 43 is disposed to the first-direction A1 side of the second support portion 42. The third support portion 43 is fixed to the second support portion 42.

The third support portion 43 has a through-hole along the axis O. The output shaft 28 is positioned in the through-hole. The plurality of bearings 55 are arranged between the inner wall of the through-hole and the output shaft 28. With this configuration, the third support portion 43 rotatably supports the output shaft 28.

The fourth support portion 44 is disposed to the first-direction A1 side of the third support portion 43. The fourth support portion 44 is fixed to the third support portion 43. The fourth support portion 44 has a through-hole along the axis O. The output shaft 28 is positioned in the through-hole.

(Supply Paths 61-64)

Next, supply paths 61 to 64 configured to supply lubricating oil to the sun gear 22, the planetary gears 23, and the ring gear 26 will be described below. The planetary gear mechanism 11 further includes the supply paths 61 to 64.

The supply path 61 is arranged to the second-direction A2 side of the sun gear 22. The supply path 61 is configured to discharge lubricating oil toward the tooth surface 22a of the sun gear 22. The supply path 61 is arranged in the input shaft 21. As shown in FIG. 4, the supply path 61 includes a first portion 611, plural second portions 612, and plural third portions 613.

The first portion 611 is arranged along the central axis of the main body 111 of the input shaft 21. The plural second portions 612 extend radially outward from the end of the first portion 611 in the first direction A1. The third portions 613 extend in the first direction A1 from the radially outer end of each of the second portions 612, and have openings 61a at the end surface 111a of the main body 111. The openings 61a are arranged to face the helical teeth 22b of the sun gear 22 in the direction along the axis O, as shown in FIG. 4. The openings 61a are arranged so as to overlap the tooth surface 22a when viewed along the first direction A1.

Figure 5B:
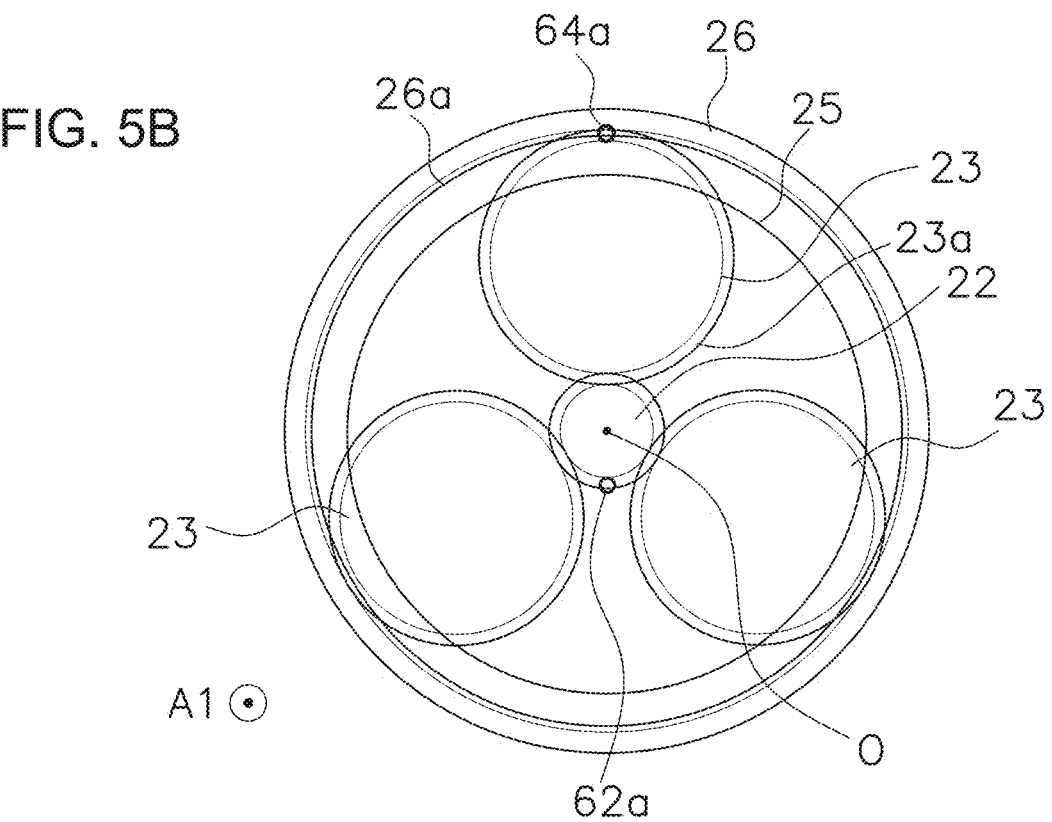
FIG. 5B is a diagram provided as a schematic view showing a positional relationship between an opening for discharging lubricating oil and gears when a planetary gear mechanism is viewed along a second direction.

FIG. 5A is a schematic diagram showing the positional relationship between the openings for discharging lubricating oil and the gears when the planetary gear mechanism 11 is viewed along the first direction A1. In FIG. 5A and FIG. 5B, which will be described later, the openings are shown enlarged for clarity. As shown in FIG. 5A, the plural openings 61a of the third portions 613 are arranged along the circumferential direction around the axis O. The openings 61a are arranged at equal intervals around the axis O. The number of openings 61a is set to be the same as the number of the planetary gears 23. The lubricating oil supplied from the first portion 611 in the first direction A1 is divided into the plurality of second portions 612, passes through the third portions 613, and is discharged through the plural openings 61a toward the tooth surface 22a. The supply path 61 corresponds to an example of a first lubricating oil supply path. The opening 61a corresponds to an example of a first discharge port.

The supply path 62 is arranged to the first-direction A1 side of the sun gear 22. The supply path 62 is configured to discharge lubricating oil toward the tooth surface 22a of the sun gear 22. The supply path 62 is arranged in the output shaft 28 and the housing 29, as shown in FIG. 3. The supply path 62 includes a first portion 621, a second portion 622, a third portion 623, a fourth portion 624, a fifth portion 625, and a sixth portion 626.

The first portion 621 is arranged on the fourth support portion 44. The first portion 621 extends from the outer surface of the fourth support portion 44 to the output shaft 28. The second portion 622 is a groove formed on the outer peripheral surface of the output shaft 28 along the circumferential direction. The first portion 621 is connected to the second portion 622 which is a groove. The third portion 623 extends from the second portion 622 toward the central axis of the output shaft 28. The fourth portion 624 extends from the end of the third portion 623 on the center side to the vicinity of the end surface 28a of the output shaft 28 in the second direction A2, as shown in FIG. 4. The fifth portion 625 extends radially outward from the end of the fourth portion 624 in the second direction A2. The sixth portion 626 extends in the second direction A2 from the radially outer end of the fifth portion 625. The sixth portion 626 has opening 62a at the end surface 28a of the output shaft 28 in the second direction A2. The opening 62a is arranged to face the helical teeth 22b of the sun gear 22 in the direction along the axis O, as shown in FIG. 4. The opening 62a is arranged so as to overlap the tooth surface 22a when viewed along the second direction A2. FIG. 5B is a schematic diagram showing the positional relationship between the openings for discharging lubricating oil and the gears when the planetary gear mechanism 11 is viewed along the second direction A2. As shown in FIG. 5B, the opening 62a is arranged at one location on the end surface 28a of the output shaft 28.

The lubricating oil passes through the first portion 621, the second portion 622, the third portion 623, the fourth portion 624, the fifth portion 625, and the sixth portion 626, and is discharged through the opening 62a toward the tooth surface 22a. The supply path 62 corresponds to an example of a second lubricating oil supply path. The opening 62a corresponds to an example of a second discharge port.

The supply path 63 is arranged to the second-direction A2 side of the ring gear 26. The supply path 63 is configured to discharge lubricating oil toward the tooth surface 26a of the ring gear 26. The supply path 63 is arranged in the housing 29. The supply path 63 is arranged on the wall portion 411 of the first support portion 41. The supply path 63 extends from the outer surface to the inner surface of the wall portion 411. The supply path 63 is arranged parallel to the axis O. The supply path 63 has an opening 63a at the inner surface of the wall portion 411. The opening 63a is arranged to face the helical teeth inside the ring gear 26 in the direction along the axis O. The opening 63a is arranged so as to overlap the tooth surface 26a when viewed along the first direction A1. As shown in FIG. 5A, one opening 63a is located, for example, at the top of the tooth surface 26a of the ring gear 26. The supply path 63 corresponds to an example of a first lubricating oil supply path or a third lubricating oil supply path. The opening 63a corresponds to an example of a first discharge port.

The supply path 64 is arranged to the first-direction A1 side of the ring gear 26. The supply path 64 is configured to discharge lubricating oil toward the tooth surface 26a of the ring gear 26. The supply path 64 is arranged in the housing 29. The supply path 64 is arranged on the wall portion 421 of the second support portion 42. The supply path 64 extends from the outer surface to the inner surface of the second support portion 42. The supply path 64 has a first portion 641 and a second portion 642. The first portion 641 is arranged perpendicularly to the axis O and extends from the outer peripheral surface of the wall portion 421 toward the inside (in the direction of the axis O). The second portion 642 is arranged from the inner end of the first portion 641 toward the second direction A2. The second portion 642 has an opening 64a at the inner peripheral surface of the wall portion 421. The opening 64a is arranged to face the helical teeth inside the ring gear 26 in the direction along the axis O. The opening 64a faces the opening 63a in the direction along the axis O. The opening 64a is arranged so as to overlap the tooth surface 26a when viewed along the second direction A2. As shown in FIG. 5B, one opening 64a is located, for example, at the top of the tooth surface 26a of the ring gear 26. The supply path 64 corresponds to an example of a second lubricating oil supply path or a forth lubricating oil supply path. The opening 64a corresponds to an example of a second discharge port.

(Switching Valve 13)

The switching valve 13 is configured to switch the supply path for supplying the lubricating oil sent from the pump 12 to the gears. The pump 12 and the tank 16 are connected by a first pipeline 71. The switching valve 13 and the pump 12 are connected by a second pipeline 72. A third pipeline 73 and a fourth pipeline 74 are connected to the switching valve 13. The third pipeline 73 is connected to the supply path 61 and the supply path 63 of the planetary gear mechanism 11. The fourth pipeline 74 is connected to the supply path 62 and the supply path 64 of the planetary gear mechanism 11.

The switching valve 13 switches the connection destination of the second pipeline 72 between the third pipeline 73 and the fourth pipeline 74. When the second pipeline 72 and the third pipeline 73 are connected by the switching valve 13, lubricating oil is supplied to the supply path 61 and the supply path 63 of the planetary gear mechanism 11. When the second pipeline 72 and the fourth pipeline 74 are connected by the switching valve 13, lubricating oil is supplied to the supply path 62 and the supply path 64 of the planetary gear mechanism 11.

The planetary gear mechanism 11 and the tank 16 are connected by a fifth pipeline 75. As shown in FIGS. 2 and 3, the lubricating oil discharged from the planetary gear mechanism 11 is returned to the tank 16.

(Rotation Sensor 14)

The rotation sensor 14 detects information for determining the rotation direction of the sun gear 22. The rotation sensor 14 transmits the detected information to the controller 15. As the rotation sensor 14, for example, a rotary encoder can be used.

The information for determining the rotation direction of the sun gear 22 may also be the information on the rotation direction of the input shaft 21 or the output shaft 28, or the information on the position of a forward/reverse switching lever of the work machine 1. When the forward/reverse switching lever is in the forward position, the sun gear 22 can be determined to be rotating in a predetermined direction, and when the forward/reverse switching lever is in the reverse position, the sun gear 22 can be determined to be rotating in the opposite direction to the predetermined direction.

(Controller 15)

The controller 15 includes a processor such as a CPU. The processor is configured to execute processes for controlling the pump 12 and the switching valve 13. The controller 15 includes a storage device. The storage device includes a memory such as RAM or ROM, and an auxiliary storage device such as a hard disk drive (HDD) or a solid-state drive (SSD). The storage device stores data and programs for controlling the pump 12 and the switching valve 13.

The controller 15 controls the switching valve 13 based on the information detected by the rotation sensor 14. Upon receiving the detected information from the rotation sensor 14, the controller 15 determines the rotation direction of the sun gear 22, switches the switching valve 13 according to the determined rotation direction, and causes lubricating oil to be discharged through the supply path 61 and the supply path 63, or through the supply path 62 and supply path 64.

The rotation of helical gears and the flow of lubricating oil will be described below: FIG. 6A is a schematic side view showing a state in which the sun gear 22 and planetary gears 23 are in mesh with each other. For easier understanding, the sizes and shapes of the planetary gears 23 are different from those in FIG. 3. FIG. 6B is a schematic diagram of the sun gear 22 and the planetary gears 23 when viewed along the first direction A1.

When the sun gear 22 rotates in the left-hand rotation direction L shown in FIG. 6B, the lubricating oil flows on the tooth surfaces 22a and 23a into the first direction A1 shown in FIG. 6A by the shape of the helical teeth 22b of the sun gear 22 and the shape of the helical teeth 23b of the planetary gears 23. In contrast, when the sun gear 22 rotates in the right-hand rotation direction R shown in FIG. 6B, the lubricating oil flows on the tooth surfaces 22a and 23a into the second direction A2.

When the sun gear 22 rotates in the left-hand rotation direction L, the lubricating oil is supplied so as to move from the second-direction A2 side of the sun gear 22, which is upstream of the flowing direction, toward the first direction A1, which thereby enables constant supply of the lubricating oil onto the tooth surfaces 22a and 23a. Furthermore, when the sun gear 22 rotates in the right-hand rotation direction R, the lubricating oil is supplied so as to move from the first-direction A1 side of the sun gear 22, which is upstream of the flow direction, toward the second direction A2, which thereby enables constant supply of the lubricating oil onto the tooth surfaces 22a and 23a.

Note that, between the ring gear 26 and the planetary gears 23 also, when the sun gear 22 rotates in the left-hand rotation direction L, the lubricating oil flows in the first direction A1, and when the sun gear 22 rotates in the right-hand rotation direction R, the lubricating oil flows in the second direction A2.

Therefore, when the controller 15 determines that the rotation direction of the sun gear 22 is the left-hand rotation direction L based on the information detected by the rotation sensor 14, the controller 15 drives the switching valve 13 to connect the second pipeline 72 and the third pipeline 73. As a result, the lubricating oil supplied from the tank 16 by the pump 12 is discharged toward the tooth surface 22a of the sun gear 22 through the opening 61a of the supply path 61 that is disposed to the second-direction A2 side of the sun gear 22. Further, the lubricating oil supplied from the tank 16 by the pump 12 is discharged toward the tooth surface 26a of the ring gear 26 through the opening 63a of the supply path 63 that is disposed to the second-direction A2 side of the ring gear 26.

When the controller 15 determines that the rotation direction of the sun gear 22 is the right-hand rotation direction R based on the information detected by the rotation sensor 14, the controller 15 drives the switching valve 13 to connect the second pipeline 72 and the fourth pipeline 74. As a result, the lubricating oil supplied from the tank 16 by the pump 12 is discharged toward the tooth surface 22a of the sun gear 22 through the opening 62a of the supply path 62 that is disposed to the first-direction A1 side of the sun gear 22. The lubricating oil supplied from the tank 16 by the pump 12 is discharged toward the tooth surface 26a of the ring gear 26 through the opening 64a of the supply path 64 that is disposed to the first-direction A1 side of the ring gear 26.

(Operation)

Figure 7:
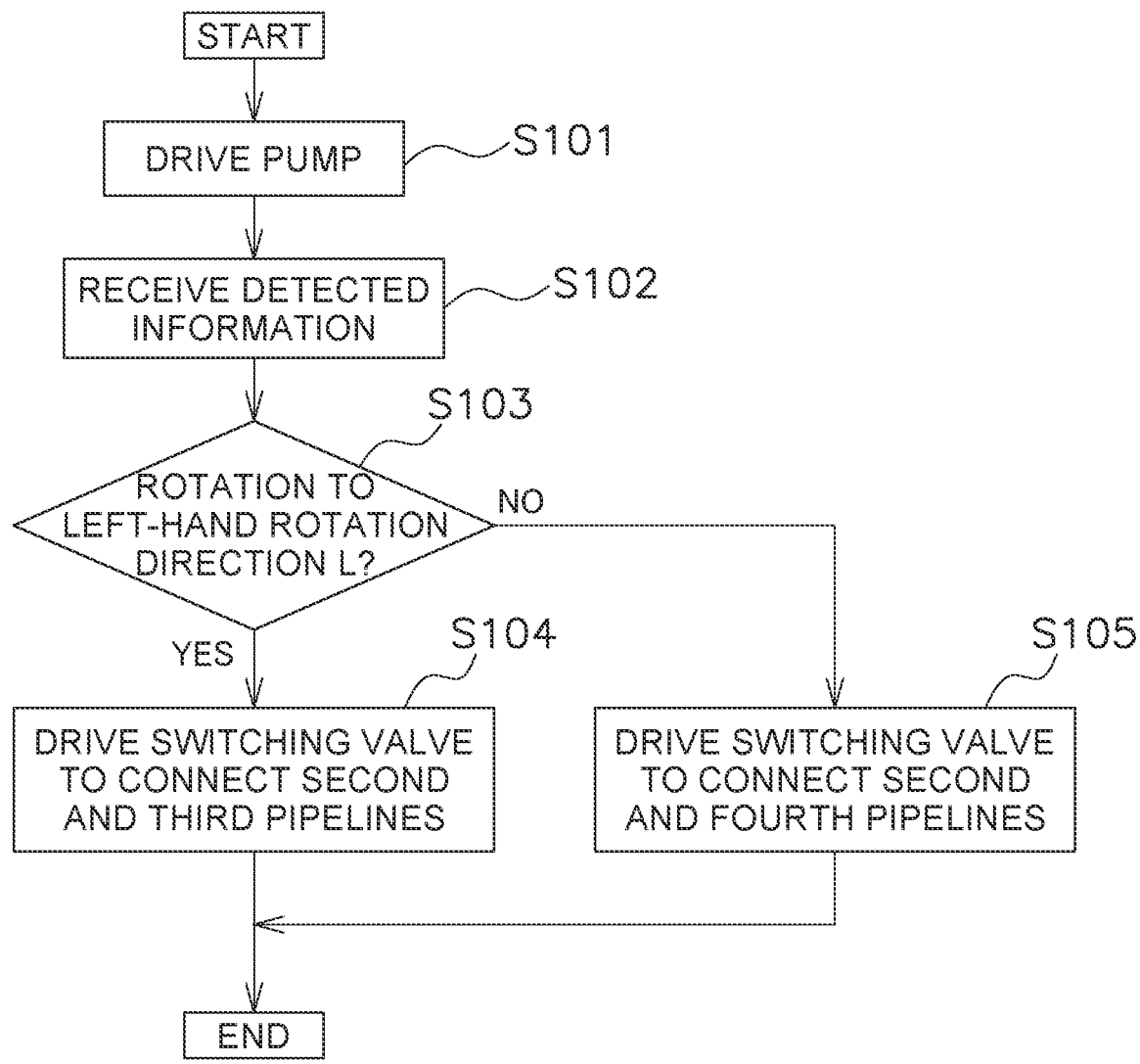
FIG. 7 is a flow diagram showing a control operation of the lubrication system.

Next, the control operation of the lubrication system 10 of the present embodiment will be described. FIG. 7 is a flow diagram showing the control operation of the lubrication system 10 of the present embodiment.

First, in Step S101, the controller 15 drives the pump 12. Next, in Step S102, the controller 15 receives information detected by the rotation sensor 14.

In Step S103, then the controller 15 determines the rotation direction of the sun gear 22 based on the received detection information. For example, the controller 15 determines whether the rotation direction of the sun gear 22 is the left-hand rotation direction L, based on the detection information.

In Step S103, when it is determined that the rotation direction is the left-hand rotation direction L, the control proceeds to Step S104.

In Step S104, the controller 15 drives the switching valve 13 to connect the second pipeline 72 and the third pipeline 73, and the control ends. As a result, the lubricating oil supplied from the tank 16 by driving the pump 12 is discharged toward the tooth surface 22a of the sun gear 22 through the opening 61a of the supply path 61 that is located to the second-direction A2 side of the sun gear 22. Further, the lubricating oil supplied from the tank 16 by driving the pump 12 is discharged toward the tooth surface 26a of the ring gear 26 through the opening 63a of the supply path 63 that is disposed to the second-direction A2 side of the ring gear 26.

In contrast, in Step S103, when it is determined that the rotation direction is not the left-hand rotation direction L, the rotation direction can be determined to be the right-hand rotation direction R, and the control proceeds to Step S105.

In Step S105, the controller 15 drives the switching valve 13 to connect the second pipeline 72 and the fourth pipeline 74, and the control ends. As a result, the lubricating oil supplied from the tank 16 by driving the pump 12 is discharged toward the tooth surface 22a of the sun gear 22 through the opening 62a of the supply path 62 that is disposed to the first-direction A1 side of the sun gear 22. The lubricating oil supplied from the tank 16 by driving the pump 12 is discharged toward the tooth surface 26a of the ring gear 26 through the opening 64a of the supply path 64 that is disposed to the first-direction A1 side of the ring gear 26.

Note that the rotation sensor 14 constantly detects information regarding the rotation direction of the sun gear 22 and sends it to the controller 15. Therefore, the rotation direction is determined every time detection information is received. For example, when the rotation direction of the sun gear 22 determined based on the previous detection information matches the rotation direction of the sun gear 22 determined based on the present detection information, the controller 15 is able to maintain the current state, without driving the switching valve 13.

(Features and Others)

(1)

The lubrication system 10 of the present embodiment is the lubrication system 10 for the planetary gear mechanism 11 including a sun gear 22 (an example of a helical gear) having helical teeth 22b, and includes the supply path 61 (an example of a first lubricating oil supply path), a supply path 62 (an example of a second lubricating oil supply path), and the controller 15. The supply path 61 is disposed on one side of both sides of the sun gear 22 in the direction along the rotation axis O of the sun gear 22 and is formed toward the tooth surface 22a of the sun gear 22. The supply path 62 is disposed on the other side of the both sides of the sun gear 22 and is formed toward the tooth surface 22a of the sun gear 22. The controller 15 switches the discharge of lubricating oil to the tooth surface 22a of the sun gear 22 between the supply path 61 and the supply path 62 based on the rotation direction of the sun gear 22.

By switching between the supply path 61 and the supply path 62 in accordance with the rotation of the sun gear 22, an appropriate amount of lubricating oil can be supplied from upstream of the direction in which the lubricating oil flows by the sun gear 22, regardless of the direction in which sun gear 22 rotates. This allows the tooth surface 22a of the sun gear 22 to be sufficiently lubricated, thereby reducing stirring loss.

(2)

In the lubrication system 10 of the present embodiment, the supply path 61 has the opening 61a (an example of a first discharge port). The opening 61a is arranged so as to overlap with the tooth surface 22a of the sun gear 22 when viewed from the direction along the rotation axis O, and the lubricating oil is discharged through the opening 61a. The supply path 62 has the opening 62a (an example of a second discharge port). The opening 62a is arranged so as to overlap with the tooth surface 22a of the sun gear 22 when viewed from the direction along the rotation axis O, and the lubricating oil is discharged through the opening 62a.

As a result, it is possible to lubricate the tooth surface 22a of the sun gear 22 by the lubricating oil discharged from the opening 61a or the opening 62a.

(3)

The lubrication system 10 of the present embodiment further includes the input shaft 21 (an example of a first shaft) and a plurality of planetary gears 23. The sun gear 22 is fixed to the input shaft 21. The plurality of planetary gears 23 are arranged around the sun gear 22 and mesh with the sun gear 22. The supply path 61 has a plurality of openings 61a through which the lubricating oil is discharged. The plurality of openings 61a are arranged in the input shaft 21.

As a result, when the sun gear 22 rotates in the left-hand rotation direction L, it is possible to lubricate the space between the sun gear 22 and the planetary gears 23 by the lubricating oil.

(4)

In the lubrication system 10 of the present embodiment, the plurality of openings 61a are arranged at equal intervals in the circumferential direction. The number of the openings 61a is equal to or greater than the number of the planetary gears 23. As a result, it is possible to supply a sufficient amount of lubricating oil between the sun gear 22 and the plurality of planetary gears 23.

(5)

The lubrication system 10 of the present embodiment further includes the planetary carrier 25, the housing 29, and the output shaft 28 (an example of a second shaft). The planetary carrier 25 rotatably supports the plurality of planetary gears 23. The housing 29 rotatably supports the planetary carrier 25. The output shaft 28 is fixed to the planetary carrier 25 and is arranged coaxially with the input shaft 21. The supply path 62 has the opening 62a through which the lubricating oil is discharged. The opening 62a is arranged in the output shaft 28.

As a result, when the sun gear 22 rotates in the right-hand rotation direction R, it is possible to supply lubricating oil between the sun gear 22 and the planetary gears 23.

(6)

The lubrication system 10 of the present embodiment further includes the plurality of planetary gears 23, the ring gear 26, the supply path 63 (an example of a third lubricating oil supply path), and the supply path 64 (an example of a fourth lubricating oil supply path). The plurality of planetary gears 23 are arranged around the sun gear 22 and mesh with the tooth surface 22a of the sun gear 22. The ring gear 26 is arranged around the plurality of planetary gears 23 and meshes with the plurality of planetary gears 23. The supply path 63 is disposed on one side of both sides of the ring gear 26 in the direction along the rotation axis O, and is formed toward the tooth surface 26a of the ring gear 26. The supply path 64 is disposed on the other side of the both sides of the ring gear 26 and is formed toward the tooth surface 26a of the ring gear 26.

As a result, it is possible to supply an appropriate amount of lubricating oil between the sun gear 22 and the plurality of planetary gears 23, and between the plurality of planetary gears 23 and the ring gear 26, regardless of whether the sun gear 22 rotates in the left-hand rotation direction L or in the right-hand rotation direction R.

(7)

The lubrication system 10 of the present embodiment is the lubrication system 10 for the planetary gear mechanism 11 including a ring gear 26 (an example of a helical gear) having helical teeth, and includes the supply path 63 (an example of a first lubricating oil supply path), the supply path 64 (an example of a second lubricating oil supply path), and the controller 15. The supply path 63 is disposed on one side of both sides of the ring gear 26 in the direction along the rotation axis O of the ring gear 26, and is formed toward the tooth surface 26a of the ring gear 26. The supply path 64 is disposed on the other side of the two sides of the ring gear 26 and is formed toward the tooth surface 26a of the ring gear 26. The controller 15 switches the discharge of lubricating oil to the tooth surface 26a of the ring gear 26 between the supply path 63 and the supply path 64 based on the rotation direction of the ring gear 26.

By switching between the supply path 63 and the supply path 64 in accordance with the rotation of ring gear 26, lubricating oil can be supplied from the upstream side of the direction in which the lubricating oil flows by the ring gear 26, regardless of the direction in which the ring gear 26 rotates. This allows the tooth surface 26a of the ring gear 26 to be sufficiently lubricated, thereby reducing stirring loss.

(8)

In the lubrication system 10 of the present embodiment, the supply path 63 has the opening 63a (an example of a first discharge port) arranged so as to overlap with the tooth surface 26a of the ring gear 26 when viewed from a direction along the rotation axis O, and the lubricating oil is discharged through the opening 63a. The supply path 64 has the opening 64a (an example of a second discharge port) arranged so as to overlap with the tooth surface 26a of the ring gear 26 when viewed from the direction along the rotation axis O, and the lubricating oil is discharged through the opening 64a.

As a result, it is possible to lubricate the tooth surface 26a of the ring gear 26 by the lubricating oil discharged from the opening 63a or the opening 64a.

(9)

The lubrication system 10 of the present embodiment further includes the sun gear 22, the plurality of planetary gears 23, the planetary carrier 25, and the housing 29. The plurality of planetary gears 23 are arranged around the sun gear 22 and mesh with the sun gear 22. The planetary carrier 25 rotatably supports the plurality of planetary gears 23. The ring gear 26 (an example of a helical gear) is arranged around the plurality of planetary gears 23 and meshes with the plurality of planetary gears 23. Each of the supply path 63 and the supply path 64 is arranged in the housing 29.

As a result, it is possible to lubricate sufficiently between the ring gear 26 and the planetary gear 23.

(10)

The planetary gear mechanism 11 of the present embodiment includes the supply path 61 (an example of a first lubricating oil supply path) and the supply path 62 (an example of a second lubricating oil supply path). The supply path 61 is disposed on one side of both sides of the sun gear 22 (an example of a helical gear) in a direction along the rotation axis O of the sun gear 22, and is formed toward the tooth surface 22a of the sun gear 22. The supply path 62 is disposed on the other side of the both sides of the sun gear 22 and is formed toward the tooth surface 22a of the sun gear 22.

By discharging lubricating oil from either the supply path 61 or the supply path 62 in accordance with the rotation of the sun gear 22, lubricating oil can be supplied from the upstream side of the direction in which the lubricating oil flows by the sun gear 22, regardless of the direction in which sun gear 22 rotates. This allows the tooth surface 22a of the sun gear 22 to be sufficiently lubricated, thereby reducing stirring loss.

(11)

The planetary gear mechanism 11 of the present embodiment includes the supply path 63 (an example of a first lubricating oil supply path) and the supply path 64 (an example of a second lubricating oil supply path). The supply path 63 is disposed on one side of both sides of the ring gear 26 (an example of a helical gear) in the direction along the rotation axis O of the ring gear 26 and is formed toward the tooth surface 26a of the ring gear 26. The supply path 64 is disposed on the other side of the both sides of the ring gear 26 and is formed toward the tooth surface 26a of the ring gear 26.

By discharging lubricating oil from either the supply path 63 or the supply path 64 in accordance with the rotation of the ring gear 26, lubricating oil can be supplied from the upstream side of the direction in which the lubricating oil flows by the ring gear 26, regardless of the direction in which ring gear 26 rotates. This allows the tooth surface 26a of the ring gear 26 to be sufficiently lubricated, thereby reducing stirring loss.

OTHER EMBODIMENTS

One embodiment of the claimed invention has been described above. However, the claimed invention is not limited to the above embodiment, and various changes can be made without departing from the scope of the claimed invention. In particular, the multiple embodiments and modifications described in this specification can be arbitrarily combined as necessary.

(A)

In the above embodiment, the supply path 61 has three openings 61a, but the claimed invention is not limited thereto, and the number may be four or more, or two or less.

Although the supply path 62 has only one opening 62a, the claimed invention is not limited thereto and may have a plurality of openings 62a.

(B)

In the above embodiment, the lubricating oil is discharged to the tooth surface 26a of the ring gear 26 from one opening 63a on the first direction A1 side, but the lubricating oil may be discharged from a plurality of openings. Furthermore, the lubricating oil is discharged to the tooth surface 26a of the ring gear 26 from one opening 64a on the second direction A2 side, but the lubricating oil may be discharged from a plurality of openings.

(C)

In the above embodiment, the opening 61a and the opening 62a are disposed to overlap with the tooth surface 22a of the sun gear 22 when viewed along the axis O, but the claimed invention is not limited to this. It is only necessary that the lubricating oil discharged from the opening 61a and the opening 62a is supplied to the tooth surface 22a.

Furthermore, the opening 63a and the opening 64a are arranged so as to overlap with the tooth surface 26a of the ring gear 26 when viewed along the axis O, but this is not limited to this. It is only necessary that the lubricating oil discharged from the openings 63a and 64a is supplied to the tooth surface 26a.

(D)

In the above embodiment, the ring gear 26 is fixed to the housing 29, the sun gear 22 and the planetary gears 23 rotate relative to the housing 29, and power is input to the sun gear 22 and output from the planetary carrier 25. However, the claimed invention is not limited to this configuration. For example, a configuration is possible in which the planetary carrier 25 is fixed to the housing 29, the sun gear 22 and the ring gear 26 rotate, and power is output from the ring gear.

(E)

In the planetary gear mechanism 11 of the above embodiment, three planetary gears 23 are arranged, but the number is not limited to three, and the number may be four or more.

(F)

The work machine 1 of the above embodiment may be a wheel loader and a forklift equipped with front and rear tires, for example, but are not limited thereto, and may be an excavator and a bulldozer, and the like that are equipped with crawler belts.

The lubrication system and the planetary gear mechanism of the present disclosure are effective in lubricating the tooth surfaces sufficiently and reducing stirring loss.

The invention claimed is:

1. A lubrication system for a planetary gear mechanism having a helical gear, the lubrication system comprising:
   a first lubricating oil supply path disposed on one side of the helical gear in a direction along a rotation axis of the helical gear, the first lubricating oil supply path being formed toward a tooth surface of the helical gear;
   a second lubricating oil supply path disposed on an other side of the helical gear, the second lubricating oil supply path being formed toward the tooth surface of the helical gear; and
   a controller configured to switch discharge of lubricating oil to the tooth surface of the helical gear between the first lubricating oil supply path and the second lubricating oil supply path based on a rotation direction of the helical gear.

2. The lubrication system according to claim 1, wherein the first lubricating oil supply path includes a first discharge port from which lubricating oil is discharged,
   the first discharge port is arranged so as to overlap with the tooth surface of the helical gear when viewed from the direction along the rotation axis,
   the second lubricating oil supply path includes a second discharge port from which lubricating oil is discharged, and
   the second discharge port is arranged so as to overlap with the tooth surface of the helical gear when viewed from the direction along the rotation axis.

3. The lubrication system according to claim 1, further comprising:
   a first shaft to which the helical gear is fixed as a sun gear; and
   a plurality of planetary gears arranged around the helical gear, the plurality of planetary gears meshing with the tooth surface of the helical gear, the first lubricating oil supply path including a plurality of first discharge ports from which lubricating oil is discharged, and the plurality of first discharge ports being arranged in the first shaft.

4. The lubrication system according to claim 3, wherein the first discharge ports are arranged at equal intervals in a circumferential direction, and a number of the first discharge ports is equal to or greater than a number of the planetary gears.

5. The lubrication system according to claim 3, further comprising:

a planetary carrier rotatably supporting the plurality of planetary gears;

a housing rotatably supporting the planetary carrier; and a second shaft fixed to the planetary carrier, the second shaft being arranged coaxially with the first shaft, the second lubricating oil supply path including a second discharge port from which lubricating oil is discharged, and the second discharge port being arranged in the second shaft.

6. The lubrication system according to claim 1, further comprising:

a plurality of planetary gears arranged around the helical gear serving as a sun gear, the plurality of planetary gears meshing with the tooth surface of the helical gear;

a ring gear arranged around the plurality of planetary gears, the ring gear meshing with the plurality of planetary gears;

a third lubricating oil supply path disposed on the one side of the ring gear in the direction along the rotation axis, the third lubricating oil supply path being formed toward a tooth surface of the ring gear; and a fourth lubricating oil supply path disposed on the other side of the ring gear, the fourth lubricating oil supply path being formed toward the tooth surface of the ring gear, the controller being configured to switch discharge of lubricating oil to the tooth surface of the helical gear between the third lubricating oil supply path and the fourth lubricating oil supply path based on the rotation direction of the helical gear.

7. The lubrication system according to claim 1, further comprising:

a sun gear;

a plurality of planetary gears arranged around the sun gear, the plurality of planetary gears meshing with the sun gear;

a planetary carrier rotatably supporting the plurality of planetary gears; and a housing rotatably supporting the planetary carrier, the helical gear being arranged around the plurality of planetary gears and meshing with the plurality of planetary gears, and each of the first lubricating oil supply path and the second lubricating oil supply path being arranged in the housing.

8. A planetary gear mechanism having a helical gear, the planetary gear mechanism comprising:

a first lubricating oil supply path disposed on one side of the helical gear in a direction along a rotation axis of the helical gear, the first lubricating oil supply path being formed toward a tooth surface of the helical gear; and a second lubricating oil supply path disposed on an other side of the helical gear, the second lubricating oil supply path being formed toward the tooth surface of the helical gear, the first lubricating oil supply path including a first discharge port from which lubricating oil is discharged, the first discharge port being arranged so as to overlap with the tooth surface of the helical gear when viewed from the direction along the rotation axis, the second lubricating oil supply path including a second discharge port from which lubricating oil is discharged, and the second discharge port being arranged so as to overlap with the tooth surface of the helical gear when viewed from the direction along the rotation axis, the first discharge port facing toward the tooth surface of the helical gear along the rotation axis, and the second discharge port facing toward the tooth surface of the helical gear along the rotation axis.

* * * * *